Oct. 1, 1946.    C. H. JOHNSON    2,408,397
MIXING PLANT
Filed Sept. 18, 1941
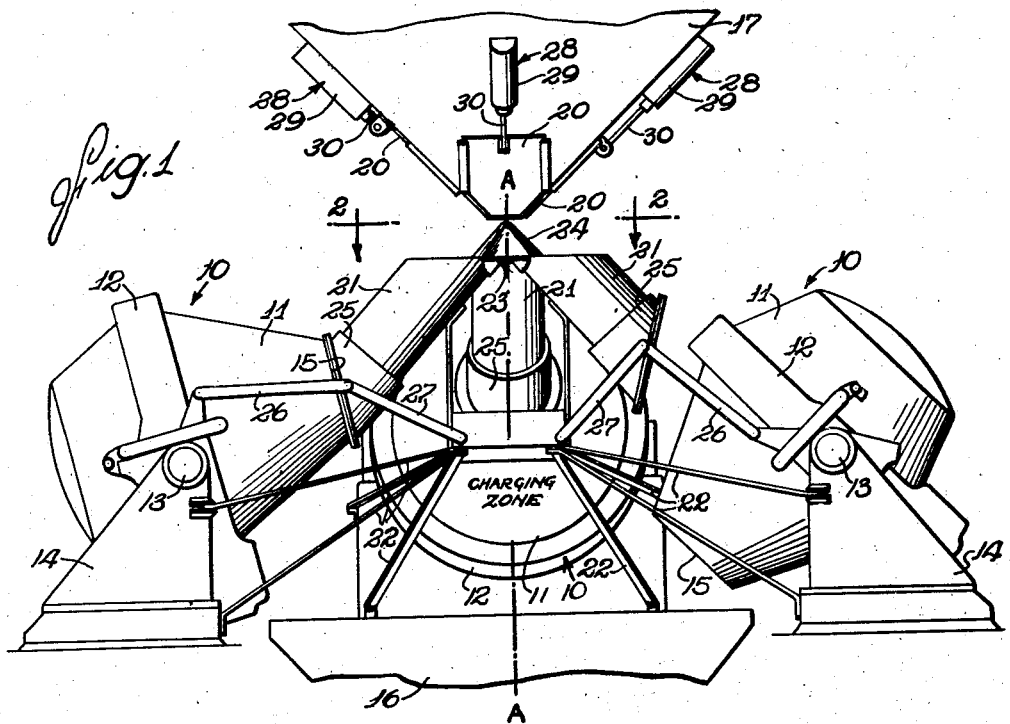
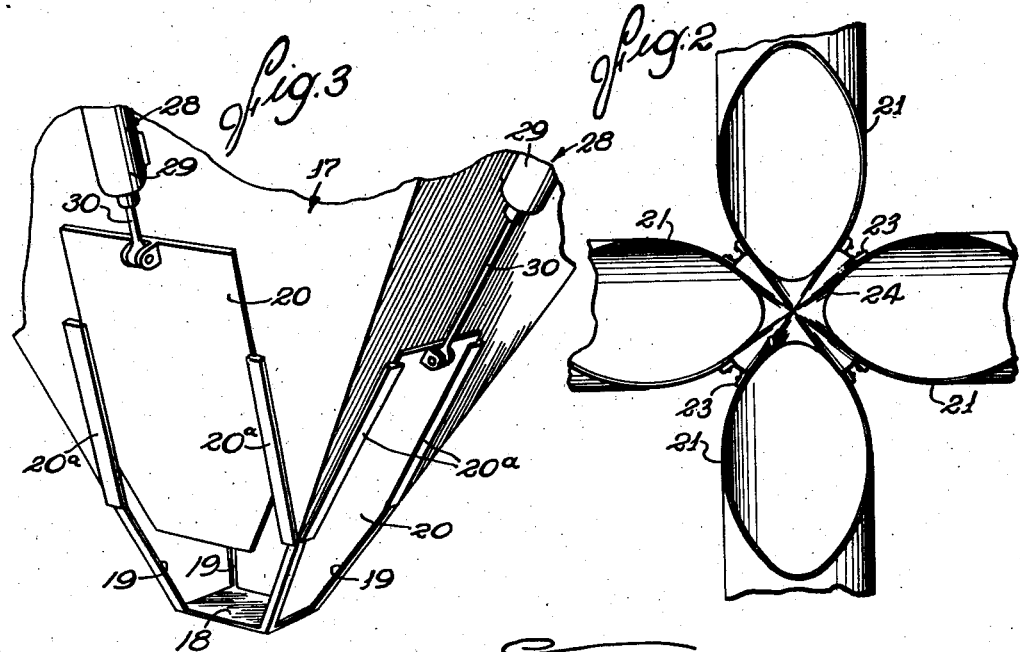
INVENTOR
Charles H. Johnson
By Parker, Carlson, Pitzner & Hubbard
ATTORNEYS Patented Oct. 1, 1946

2,408,397

UNITED STATES PATENT OFFICE 2,408,397

MIXING PLANT

Charles H. Johnson, Champaign, Ill., assignor to The C. S. Johnson Company, Champaign, Ill., a corporation of Illinois Application September 18, 1941, Serial No. 411,362

5 Claims. (Cl. 259—152)

The present invention relates to mixing plants for concrete, and more particularly to improvements in mixing plants of the so-called concentric zone type.

Plants of this type commonly embody a plurality or battery of mixers disposed about a common center and all charged with materials apportioned by a single set of weigh batchers or the like. Charging the materials into alternative ones of simply a pair of mixers in such a plant can be readily accomplished rather easily as, for example, by dispatching them by a flip-flop valve or the like through one leg or the other of a so-called pant-leg chute. But with three or more mixers the difficulties of the problem are greatly increased, particularly with regard to the provision of mechanism for selectively dispatching the materials, which is sufficiently rugged for use in such an installation and yet of simple and low cost construction.

One general object of the present invention is to provide a mixing plant embodying three or more mixers, together with a novel mechanism, for selectively charging them one at a time, and which mechanism is characterized particularly not only by the simplicity of the set-up, but also by the extremely small over-all height required for the parts of the plant.

More particularly, it is an object of the invention to provide a mixing plant with three or more mixers and embodying a novel aggregate collecting hopper in which the means for effecting a selective charging of the three or more mixers is primarily incorporated in the hopper itself and arranged to coact with a simple baffle structure beneath the hopper in dispatching the material to a desired mixer, thereby minimizing not only the cost but also the size of the plant.

Further objects and advantages of the invention will become apparent as the following description proceeds, taken in connection with the accompanying drawing, in which:

Figure 1 is a side elevation of a concentric zone mixing plant embodying the invention, only three of the four mixers contemplated being shown, and the fourth, which would be the one nearest the observer, being omitted to make plain the arrangement of the centrally located parts.

Fig. 2 is a detail plan view of the charging chutes included in the plant.

Fig. 3 is an enlarged detail perspective view of the lower end portion of the collecting hopper.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The mixing plant shown in the drawing for purposes of exemplification of the invention comprises a plurality or battery of mixers 10 disposed in a common horizontal plane and all facing inwardly toward the vertical central axis A—A of a central space or "charging zone." The mixers have been shown as equally spaced with respect to each other and, in this case, located at intervals of about ninety degrees from each other about the axis, since four mixers are contemplated for the present set-up (three of which appear in Fig. 1). These mixers are themselves of conventional and well-known form, each comprising a mixing drum 11 revolubly mounted in a cradle 12 which is tiltable on trunnions 13 journaled in a base 14. The mixers have been shown as being of the tilting variety of the front-charged, front-discharged type, and have in their inner or forward ends circular openings at 15 through which aggregates are not only charged preparatory to mixing but are also later discharged from the drums after mixing.

During charging and mixing, the drums 11 occupy a generally upwardly tilted position exemplified by the lefthand one of the mixers shown in Figure 1. Conversely, during discharging the mixer drums are tilted downwardly, to the position exemplified by the righthand one of the mixers shown in Fig. 1, to effect a free gravity discharge of the mix from the mixer drum. The contents of the various mixers may be discharged into any suitable receiver such, for example, as a receiving hopper, the upper portion of which is indicated at 16. In the present instance this receiving hopper 16 is located below the mixers and substantially concentric with the axis A—A.

In accordance with the present invention, a novel collecting hopper and associated chute structure have been provided for effecting the selective charging of the several mixers 10. In the illustrative construction, an aggregate collecting hopper 17 is provided, which is of inverted, generally pyramidal or conical shape, and is stationarily mounted at a point elevated above the battery of mixers. This collecting hopper 17 serves to receive aggregates or dry constituents of the cement mix, such as sand, gravel, crushed rock, dry cement, etc., and which are fed into it by the usual batching devices (not shown), such as automatic batch weighers. The collecting hopper 17 is multi-sided, having one side facing generally toward each mixer in the battery and consequently is four-sided in the present instance, and tapers downwardly to a lower rectangular end which is closed at 18 (see Fig. 3).

A plurality of outlet openings 19 are distributed circumferentially about the lower end portion of the collecting hopper 17, one for each of the several mixers 10. As noted above, the collecting hopper desirably has at least as many sides as there are mixers, and each of the outlet openings 19 is cut in the lower portion of a corresponding one of the sides or side faces of the collecting hopper. Individual closures, in the form of sliding doors or gates 20, are provided for the several hopper outlets 19. These doors are slidable endwise along the respective faces of the hopper which they overlie, the side edges of the doors being received in grooved guides 20a fixed on the hopper. Of the two doors which fully appear in Fig. 3, the lefthand one is shown as pulled upward to its open position while the righthand one is shown as thrust downward in its closed position.

Any suitable means may be employed for operating the closures or doors 20. In Figs. 1 and 3 this means has been illustrated in the form of pneumatic actuators 28 comprising cylinders 29 and in which are slidable pistons 30. One such actuator is provided for each door. The cylinders are fixed to the upper portion of the collecting hopper 17 while the lower ends of the pistons 30 are connected to the upper edges of the sliding doors 20. Thus, as the pistons are drawn into the cylinders the doors are pulled upward to open position and, conversely, as the pistons are projected from the cylinders the doors are thrust downward to close.

To direct the aggregates discharged from the several outlets 19 in the collecting hopper 17 to the corresponding mixers, a plurality of charging chutes 21 is provided (see Fig. 1). The charging chutes are tubular in form, being cylindrical in the present instance, and are all stationarily mounted on a suitable tripod 22. It will be observed that the chutes 21 are inclined steeply downward to points adjacent the charging openings 15 of their respective mixers so that a rapid gravity flow of aggregates will be accomplished and need take place only through a very short distance. The upper ends of the stationary charging chutes 21 are all open (see Fig. 2) and terminate in a common horizontal plane located just beneath the lower end of the collecting hopper 17. The upper end portions of the charging chutes are tied together by a frame 23 on the center of which is fixed an eminence or upwardly extending baffle 24 of a generally pyramid form. The baffle 24, in this case, has four sides, which slope outwardly and downwardly toward the mouths of corresponding ones of the chutes 21 and are concaved as indicated in Fig. 2 to conform to the curvature of the adjacent edges of the chute mouths. The upper end of the baffle 24 is located immediately beneath the lower end of the collecting hopper and disposed coaxially therewith. When any one of the doors 20 is opened, the adjacent side face of the baffle 24 serves to direct the aggregates, which flow from the hopper, down into the corresponding one of the charging chutes.

To couple the lower ends of the stationary charging chutes 21 with the openings 15 of their respective mixer drums, retractable snout chutes 25 are utilized (Fig. 1). The particular snout chutes illustrated are loosely telescoped on the lower ends of the chutes 21 and are adapted to slide axially along the latter. Each of the snout chutes 25 has pivoted on it a pair of links 26 and 27. The outer ends of the links 26 are pivotally connected to the mixer cradles 12, while the opposite ends of the links 27 are pivotally connected to the head of the tripod 22. When the mixers 10 are tilted upwardly into their charging positions (exemplified by the lefthand mixer in Fig. 1) the linkages 26, 27 are distended so as to pull the retractable snout chutes 25 downward and thus couple the stationary chutes 21 to the noses of the mixer drums. On the other hand, when the mixers 10 are tilted downward, to their discharge positions, exemplified by the righthand mixer in Fig. 1, the linkages 26, 27 are partially collapsed, thereby forcing the attached snout chutes 25 upward, axially, along the associated charging chutes 21 a sufficient distance to clear the nose of the associated mixer.

The operation of the illustrated mixing plant will, in general, be clear from the foregoing. By way of résumé, it may be noted that suitably proportioned aggregates are fed into the collecting hopper 17. From this hopper 17 the aggregates are charged into any desired one of the several mixers 10 simply by manipulation of the selectively operable discharge doors 20 on the mixing hopper. For example, if it is desired to charge the lefthand one of the mixers 10, shown in Fig. 1, the corresponding one of the doors 20 is pulled upward by its actuator 28 to the open position there illustrated, and the mixer itself is tilted upwardly to its charging position as also there shown. Thereupon the contents of the collecting hopper 17 is discharged through the opened door 20 and flows into the registering open mouth of the corresponding charging chute 21, whereupon it flows on down by gravity through the latter into the mixer drum. During this time the other three doors 20 are retained closed.

At the completion of the charging operation outlined above, the one of the doors 20 which has been opened is closed and the collecting hopper 17 is refilled with a suitably proportioned batch of aggregates. Thereafter another desired one of the doors 20 is opened so as to direct the hopper contents into the corresponding mixer. While one mixer is being charged, and also while the collecting hopper is being refilled, the other mixers can be proceeding with the mixing as well as the discharge of their contents.

From the foregoing it will be seen that full selectivity of operation is afforded despite the fact that the apparatus is very simple and rugged in construction. It should also be particularly noted that the overall height of the apparatus is very small in view of the fact that only quite short and steeply inclined chutes, exemplified by the chutes 21, need be provided between the single collecting hopper and the several mixers. Since the act of selection is accomplished by manipulation of plural outlets on the sides of the collecting hopper, it is unnecessary to provide any selection chute or spout arrangement between the collecting hopper and stationary chutes, so that no additional height for any such intermediate selection mechanism need be provided.

I claim as my invention:

1. A concentric zone concrete mixing plant comprising, in combination, a battery of three or more mixers each having a charging opening therein and all disposed with said openings facing generally inward toward a common center, a plurality of stationary charging chutes leading upwardly and inwardly from points adjacent the charging openings of corresponding ones of said mixers to points adjacent a vertical axis coincident with said common center, all of said charging chutes terminating in open upper ends or mouths lying substantially in a common horizontal plane, an aggregate collecting hopper disposed above said chutes and shaped to taper downwardly to a small lower end located substantially on said axis, said hopper having a plurality of outlet openings distributed circumferentially about its lower portion and disposed in alinement with the upper ends of respective ones of said chutes, individually operable closures for said outlet openings, and an upwardly projecting baffle structure disposed beneath the lower end of said hopper and centrally between the upper ends of said chutes, said baffle presenting side faces sloping downward toward the mouths of respective ones of said chutes.

2. In a concrete mixing plant, means for holding a supply of aggregates and for selectively discharging said supply of aggregates to any one of a plurality of concrete mixers comprising: a single compartment aggregate hopper adapted to discharge through its bottom portion; spouts fixed with relation to said hopper, each spout extending from the bottom portion of the supply hopper downwardly and outwardly away from the hopper toward one of said mixers, and each spout having bottom and side walls for directing the contents of the hopper toward the concrete mixers; and valve means for each spout for controlling the flow of aggregates therethrough, said valve means cooperating with each other to constitute substantially the entire bottom portion of the hopper and being so related to the spouts that those valve means remaining closed upon opening of any one valve means in effect form continuations of the bottom and side walls of the chute controlled by said open valve means to direct the discharge of the entire hopper contents into said chute.

3. In combination: an elevated one-compartment charging hopper adapted to discharge at its bottom; a plurality of concrete mixers; means mounting the mixers with their mouths facing a common center under and close to the bottom of the charging hopper; duct means between the mouth of each mixer and the charging hopper for conducting aggregates from the hopper to the mixers; and valve means for each of said duct means controlling the flow of aggregates from the charging hopper into the duct means, said valve means forming at least a part of the bottom portion of the charging hopper and being so shaped that upon the opening of any one valve means to provide a discharge opening for the charging hopper the remaining closed valve means guide the hopper contents towards the opening.

4. In combination with a battery of concrete mixers of the type having a combined charging and discharging mouth arranged with their mouths all facing a common center: a distributing unit for feeding aggregates to the mixers and comprising a hopper mounted substantially centrally of said battery of concrete mixers and at an elevation sufficient to enable aggregates to flow by gravity from the hopper into the mixers; a plurality of fixed spouts mounted under the hopper, each of said spouts being directed toward one mixer; valve means for disconnecting each spout from the interior of the hopper, said individual valve means being so positioned and of sufficient size that the opening of any one effects discharge of the hopper contents into the associated spout; and a movable chute structure connected with each spout movable to and from a position forming an extension thereof to direct aggregates flowing down the spout into the mouth of the respective mixer.

5. For use in selectively dispatching material to individual points arranged at spaced intervals about the center of a charging zone, a collecting hopper tapering downward toward its lower end portion for bottom discharge, a plurality of gates, one for each of a plurality of points of dispatch, disposed in a circumferential series at the bottom of said hopper and cooperating with each other to constitute substantially the entire lower end portion of said hopper, and means for opening any selected one of said gates while leaving the others closed, whereby the opening of a selected gate serves to effect gravity discharge of the hopper contents downward and outward to a corresponding point from the lower end of the hopper, the remaining closed gates serving as continuations of the downwardly tapering hopper walls to direct the hopper contents out through the opened gate during such discharge.

CHARLES H. JOHNSON.